Patented Sept. 1, 1925.

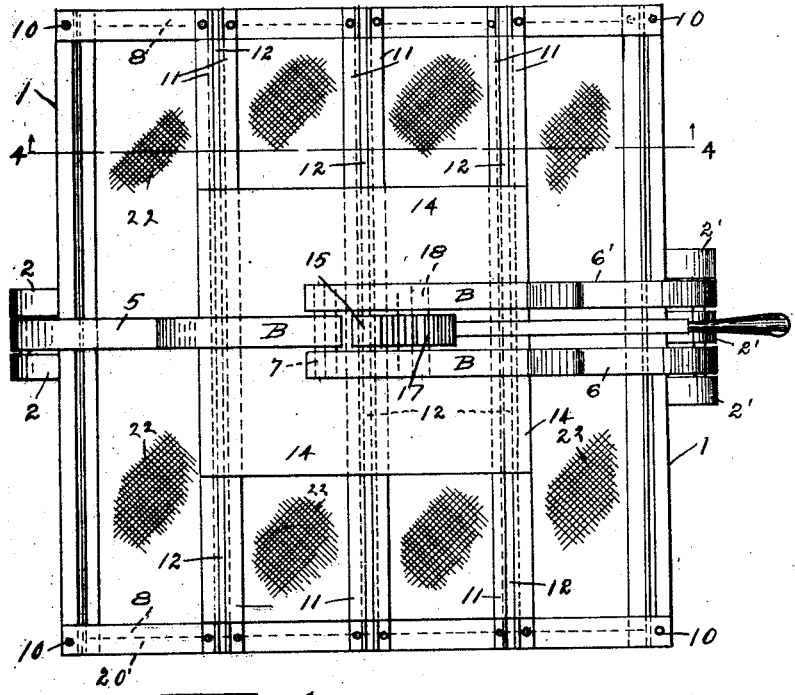

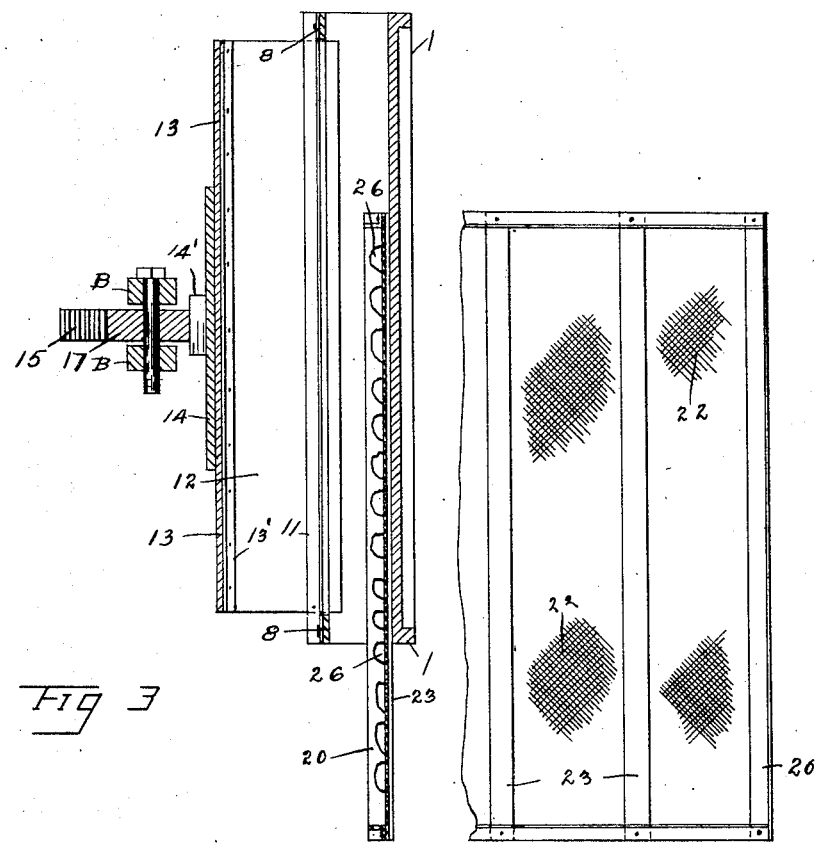

1,551,679

UNITED STATES PATENT OFFICE.

MILIVOJ MARTINOV, OF SALT LAKE CITY, UTAH.

DOUGH-CUTTING MACHINE.

Application filed September 5, 1923. Serial No. 660,974.

*To all whom it may concern:*

Be it known that I, MILIVOJ MARTINOV, a citizen of the United States, residing at Salt Lake City, in the county of Salt Lake and State of Utah, have invented a new and useful Dough-Cutting Machine, of which the following is a specification.

This invention relates to improvements in a dough cutting machine to be used by bakers in the process of cutting the dough to the proper size for making French rolls, or biscuits and the like.

One object of this invention is to provide a dough cutting machine for cutting the long strings of dough to proper length after it has been placed within the baking pan.

Another object of this invention is to provide a dough cutting machine with a removable baking pan in which the dough can be placed to be cut and then the pan removed with the dough therein to be placed in the oven for baking.

Another object of this invention is to provide a dough cutting machine with a removable baking pan with a wire netting bottom for the dough to be placed thereon.

Another object of this invention is to provide a dough cutting machine with a removable baking pan, which has a wire netting for the bottom of the baking pan, so that all surplus grease will drain out of the pan and allowing only enough grease to remain on the netting to give the French rolls the desired flavor.

Another object of this invention is to provide a dough cutting machine that is cheap in construction, easy to take apart for cleaning and quickly assembled.

Another object of this invention is to provide a dough cutting machine that will save time and labor in preparing the rolls for the oven, and to do away with the work of cutting the dough by hand as is done at the present time.

With these and other objects in view my invention consists of the following parts to be hereinafter described and claimed.

Referring to the drawings, in which;

Figure 1 is a plan view of the invention with the plate 13 removed to show the wire netting in the bottom of the baking pan 20.

Fig. 2, is an end view of Fig. 1.

Fig. 3, is a section on line 3—3 Fig. 2, showing the baking pan 20 partly out of the machine with dough 26 shown thereon.

Fig. 4, is a view on line 4—4 Fig. 1.

Fig. 5, is a plan view showing part of the baking pan.

Similar letters and numerals refer to like parts throughout the several views of the drawings.

1 denotes the base of the machine with lugs 2 and 2' integral with the sides thereof. The lugs 2 and 2' support the yoke B. The yoke B is comprised of three arms or sections, but can be made in one piece if so desired. The arm 5 is hinged within the lugs 2 while the arms 6 and 6' are hinged in the lugs 2'. The arms 5, 6 and 6' are secured within said lugs by a bolt 24. The arm 5 is secured within the arms 6 and 6' and attached thereto by the bolt 7.

On each end of the frame is placed a cross rod 8, which extends from side to side and is secured to the sides of the frame by bolts 10. Secured to the cross rod 8 are the knife guides 11 through which the knives 12 operate.

The knives 12 are secured to a plate 13 by angle irons 13' or other mechanical means. The plate 13 extends the full length and width of the knives 12. To the plate 13 is secured another plate 14 for reenforcing the plate 13. Secured to the plate 14 is a block 14' in which is secured the lower end of the lifting rack 15.

The rack 15 extends upward from the block 14' the upper end thereof passing between the arms 6 and 6' of the yoke B. Pivotally placed between the arms 6 and 6' and secured therein by the pin 18 is a segment gear 17 having a handle 19 attached thereto. The segment gear and handle operates the rack 15 to raise and lower the knives 12.

A removable dough or baking pan 20 is placed within the base and resting under the knives for containing the dough for the rolls while being cut by the knives and while being baked in the oven. A wire netting 22 forms the bottom of said pan, and is reenforced by strips 23 which also receive the cutting edge of the knives when the dough is cut.

Having described the parts of my invention I will now illustrate the operation of same.

As the baker prepares the dough for the rolls in long strips or strings he places them in the pan 20 upon the wire netting and over the reenforcing strips 23 as shown at 26 in Fig. 3. After the pan has been filled the baker now takes it and places it in the machine under the knives 12. When so placed the handle 19 is raised up to the position as shown by dotted lines 30 thus lowering the knives 12 and cutting the dough to the proper length. Now the handle is moved back to place and the pan removed to be placed in the oven for baking.

In the event that the machine is to be cleaned and must be taken apart, the bolt 7 is removed thus disconnecting the arm 5 from the arms 6 and 6' allowing the arm 5 to be moved outward in the direction of the arrow B and the arms 6 and 6' to be moved in the direction of the arrow A, the arms swinging on the bolt 24. When the arms are so placed, the plate 13 supporting the knives and the knives with all parts attached can be removed and placed to one side for cleaning.

It is to be understood that the form of my invention herein shown changes in the shape, size and arrangement of parts may be resorted to without departing from the spirit of the invention or the scope of the claims.

Having thus described my invention, what I claim and desire to secure by Letters Patent, is:

1. A dough cutting machine of the character described having a base, said base having lugs integral therewith projecting from the sides thereof, arms pivotally placed within said lugs, said arms being connected to form a yoke, one of said arms interlocking the other of said arms, means for holding said arms together, said base having a cross brace secured to the ends thereof, knife guides secured to said cross braces, a knife operating within said knife guides for cutting the dough within the baking pan, a rack connecting said arms with said knives, a gear supported by said arms, said rack and said gear for operating said knives in the movement of said gear substantially as described.

2. A dough cutting machine of the character described having a base, arms pivotally attached to said base, one of said arms on one side of said base and the other of said arms on the other side of said base, one of said arms interlocking the other of said arms, said arms when interlocked forming a yoke, said base having a cross brace secured to the ends thereof, knife guides secured to said cross braces, knives operating within said guides, means for connecting said knives with said yoke and means supported by said yoke for operating said knives substantially as described.

3. A dough cutting machine of the character described having a base, arms pivotally attached to said base, one of said arms on one side of said base and the other of said arms on the other side of said base, one of said arms interlocking the other of said arms, said arms when interlocked forming an arch, said base having a cross brace secured to the ends thereof, knife guides secured to said cross braces, a lifting gear supported by said arms, said lifting gear having a handle thereon for operating said lifting gear, a rack operating within said arms by said lifting gear, said rack having plates attached thereto, cutting knives supported from said plates, said knives operating between said guides, and means for securing said knives to said plates.

In witness whereof I affix my signature.

MILIVOJ MARTINOV.